United States Patent [19]

Solomon

[11] 4,299,456
[45] Nov. 10, 1981

[54] EYEGLASS FRAME WITH SUPPORT FOR TEMPLE CONNECTION

[76] Inventor: Charles I. Solomon, P.O. Box 12495, San Antonio, Tex. 78125

[21] Appl. No.: 119,536

[22] Filed: Feb. 7, 1980

[51] Int. Cl.³ .................. G03B 17/46; G03B 21/18; G03B 41/10; G03B 3/00
[52] U.S. Cl. .................. 351/121; 351/153; 351/111; 351/140
[58] Field of Search ............ 351/121, 111, 153, 140

[56] References Cited

U.S. PATENT DOCUMENTS 1,294,390  2/1919  Burke ..................... 351/140 X
2,630,569  3/1953  Baratelli .................. 351/153 X Primary Examiner—John K. Corbin
Assistant Examiner—Rodney B. Bovernick
Attorney, Agent, or Firm—Gunn, Lee & Jackson

[57] ABSTRACT

An eyeglass frame comprising two lens rings and two temples, the frame being supported and reinforced at the point of engagement of the temples and the lens rings by a loop or series of loops extending from the side of the eyeglass frame. The loop or loops that contact the outside portion of the temples is rigid enough to support and reinforce the junction of the lens ring and temple yet is pliable enough when heated to allow adjustment of the eyeglass frame to comfortably fit a wearer.

4 Claims, 6 Drawing Figures

EYEGLASS FRAME WITH SUPPORT FOR TEMPLE CONNECTION

BACKGROUND OF THE INVENTION

The present invention relates to an improved design for prescription and cosmetic eyeglass frames. The outer edge of an eyeglass frame has a loop or series of loops that contact the outside portion of a temple at the junction point of the eyeglass frame and the temple in such a manner as to support and reinforce the junction point. The eyeglass frames are constructed in a conventional manner as far as attachment of the temples to the lens frame. The uniqueness of the present invention resides in the co-action of the temples and the loop or loops that extend from the outside edge of the eyeglass frame. At the contact point of the loop or loops and the temple is a barrel hinge, typical of the type found in eyeglass frames. It is in this contact point area that most adjustments and repairs of eyeglass frames are performed. By using the eyeglass frames of the present invention, fewer repairs and adjustments are necessitated.

BRIEF DESCRIPTION OF THE PRIOR ART

Up until a few years ago, eyeglasses were worn only to correct imperfect vision. Eyeglass frames were of a functional nature mostly constructed of metal or metal alloy. However, with the increasing influence of fashion and the advancements in technology, eyeglasses are now worn for both prescription and cosmetic purposes. Frames are now made of various rigid yet shapeable plastic materials, metals, metal alloys and combinations thereof. The frames themselves have a variety of shapes, such as square, round, oval, rectangular. Temples for the frames can be straight, curved, wavy, or many other designs limited only by the designer's imagination. Traditionally, temples are basically straight at one end and curved on the opposite end in a manner to conform generally to the shape of a wearer's ear. The color of the eyeglass frames are unlimited and many frames available now contain a variety of colors. Enhancement of the eyeglass frames has been achieved, for example, by embedding artifical stones or metal flakes in the frames, personalized monogramming of the frame and/or lenses, and unusual designs of the frames. Some examples of the vast selection of eyeglasses now available are shown in the photograph accompanying the instant application. The eyeglass frame on the right in the photograph has a loop on each corner of the eyeglass frame, the loop being merely ornamental to enhance the appearance of the frame and performing no known function. The eyeglass frame on the left in the photograph has a curved metal piece extending from the side of the rearward to the temples and connecting the lens retaining portion of the frame to the temples. None of the prior art discloses the eyeglass frame of the present application wherein the point of connection of the temple and lens ring is supported and reinforced by the cooperative action of a temple hinge mount and extension and at least one loop in contact therewith.

SUMMARY OF THE INVENTION

The eyeglass frames of the present invention utilize eyeglass frames having two lens rings of relatively conventional configuration. These two lens rings are attached in the conventional manner by a nose bridge. The eyeglass frame is completed by attaching relatively conventionally constructed temples to the lens rings by conventional barrel hinges located on the temple hinge mounts. The variation in the construction of the eyeglass frames of the invention resides in the area of the eyeglass frame at the connection of the temples to the lens rings. A loop or series of loops extending from the lens rings contacts the outside of the temples at the pivot point of the barrel hinge. By contacting the temples at this pivot point, the loop or loops provide support and reinforcement at this pivot point. The connection point of the temples to the lens rings is a stress point in eyeglass frames and is the location of a majority of the repairs and adjustments made to eyeglass frames.

Several species of the invention concept are contemplated. The first species employs a single support and reinforcement loop and an L-shaped temple hinge mount and extension; the second species, a single loop and a straight temple hinge mount and extension; the third species, a double loop and an L-shaped temple hinge mount and extension; the fourth species, a double loop and a straight temple hinge mount and extension.

BRIEF DESCRIPTION OF THE DRAWINGS

For a detailed description of the construction of the eyeglass frame of this invention concept, reference is made to the attached drawings wherein the construction of the preferred species and all related species are illustrated and will be described in the following detailed description.

DETAILED DESCRIPTION OF THE PREFERRED EMBODIMENT

Figure 1:
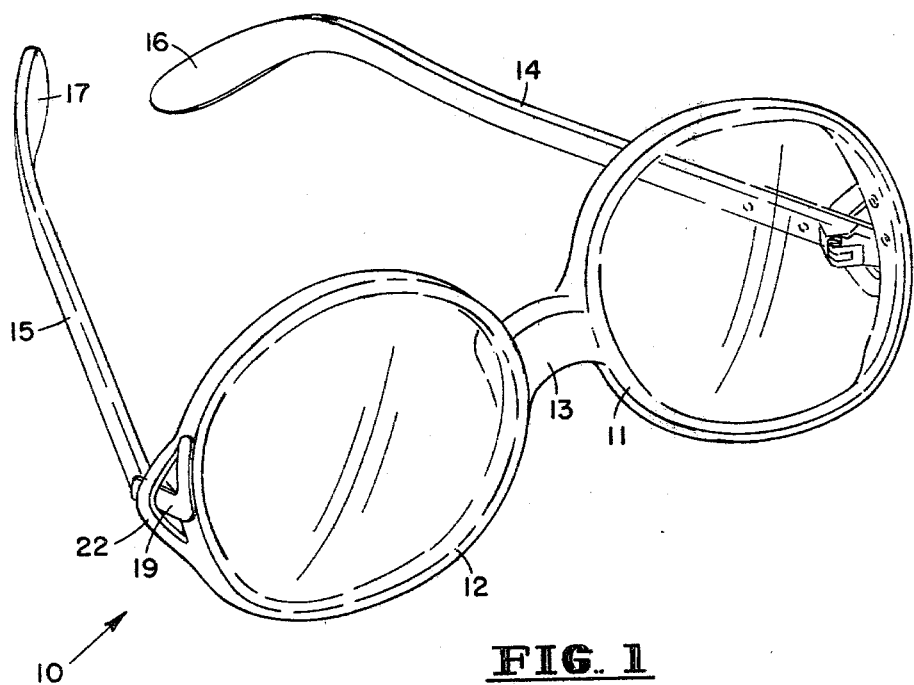
FIG. 1 is a perspective view of an eyeglass frame incorporating a first species of the inventive concept of a single support and reinforcement loop and L-shaped temple hinge mount and extension.

For a detailed description of the preferred embodiment and the various species, reference is made to the attached several views wherein identical reference characters will be utilized to refer to identical or equivalent components throughout the various views and the following description.

The construction of the eyeglass frame 10 is rather conventional as illustrated in FIG. 1. The frame 10 utilizes a first lens ring 11 and a second lens ring 12 secured in a unitary structure with a nose bridge 13. The eyeglass frames 10 include a first temple member 14 and a second temple member 15 having first and second ear-engaging sections 16 and 17, respectively. Barrel hinge 18 connects the temple hinge mount 19 secured on lens ring 12 to temple hinge extension 20 secured to temple 15 by temple hinge extension screws 21.

The variation in construction of eyeglass frames 10 of this invention resides in the co-action of support and reinforcement loop 22 and of temple 15. Loop 22 contacts the outside of temple hinge mount 19 at the pivot point of the temple hinge mount 19 and the temple hinge extension 20. This pivot point is located at the barrel hinge 18. By contacting temple hinge mount 19 in close proximity to barrel hinge 18, loop 22 provides support and reinforcement to the pivot point and entire temple 15. This support and reinforcement aids in eliminating the problems eyeglass frame wearers encounter, such as sprung temples, broken temples at the pivot point, and maladjustment of the temples in relation to the lens rings.

Figure 3:
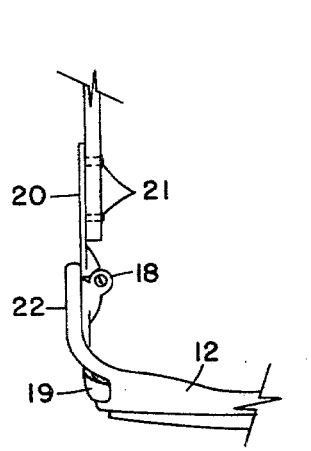
FIG. 3 is a top fragmented detailed view of the eyeglass frame and temple of FIG. 1.
Figure 2:
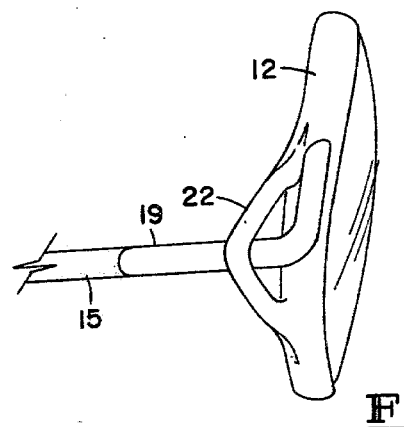
FIG. 2 is a fragmented side view of the eyeglass frame of FIG. 1.

The preferred embodiment of this invention is illustrated in FIGS. 1-3 which consists of a single support and reinforcement loop 22 in conjunction with an L-shaped temple hinge mount 19 and temple hinge extension 20. Loop 20 extends perpendicularly from lens ring 12. L-shaped temple hinge mount 19 is secured to the outside of lens ring 12 in a way such that the L extends through the loop 22 and rearward of lens ring 12. Temple hinge mount 19 passes behind and contacts loop 22. Half of barrel hinge 18 is securely attached the rearward end of temple hinge mount 19 prior to temple hinge mount 19 being secured to lens ring 12. Temple hinge extension 20 having securely attached thereon the compatible half of barrel hinge 18 which is secured to temple 15 with screws 21. The temple 15 is thereby connected to the temple hinge mount adapted lens ring 12 by fitting the compatible halves of barrel hinge 18 and securing same with a screw. The eyeglass frame 10 of the invention is thereby formed, said frame 10 having temples 14 and 15 that are supported and reinforced by a loop 22 that contacts the outside of the temple at the pivot point of barrel hinge 18.

Figure 4:
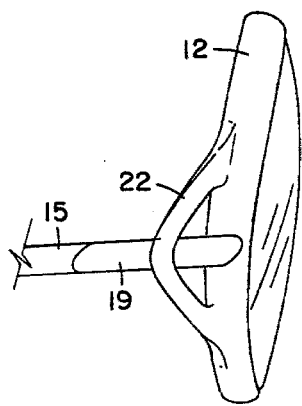
FIG. 4 is another species of the embodiment of FIG. 2 having a straight temple hinge mount and extension.
Figure 6:
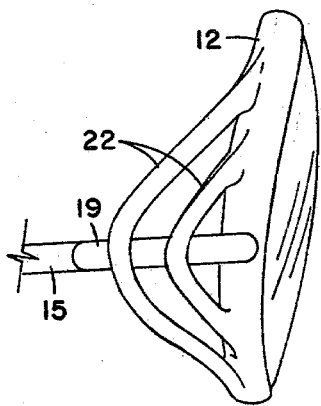
FIG. 6 is another species of the embodiment of FIG. 2 having a double loop and a straight temple hinge mount and extension.
Figure 5:
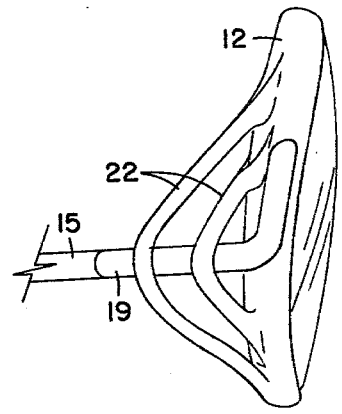
FIG. 5 is another species of the embodiment of FIG. 2 having a double loop and an L-shaped temple hinge mount and extension.

The second, third and fourth species of the invention are illustrated in FIGS. 4, 5 and 6, respectively. In each of these species, the construction of eyeglass frame 10 is the same as discussed above. The distinction of FIGS. 4-6 from FIGS. 1-3 is the particular combination of a single or double loop in conjunction with an L-shaped or straight shaped temple hinge mount. In FIG. 4, a single loop and a straight temple hinge mount are used; in FIG. 5, a double loop and an L-shaped temple hinge mount are used; in FIG. 6, a double loop and a straight temple hinge mount are used. In instances where a straight temple hinge mount is utilized, the mount is secured to lens ring 12 in the same manner as discussed previously and also passed behind loop or loops 22. The barrel hinge 18 can be located behind either loop in eyeglass frames having two loops. It is the loop located on the outside of the barrel hinge that produces the unobviousness results of the invention, support and reinforcement at the stressed section of the temples. Support and reinforcement at this common weak point in eyeglass frames helps eliminate some of the problems associated with eyeglass frames as previously discussed. The construction of the device of this invention has been described in detail. What is desired to be claimed is all modifications and adaptations of this invention not departing from the scope of equivalents as defined in the appended claims.

I claim:

1. An eyeglass frame comprising:
   a. a pair of lens rings, said rings having at least one loop extending rearward from the outer perimeter of said lens rings and generally perpendicular to said lens rings;
   b. a nose bridge connecting said pair of lens rings;
   c. temple hinge mounts secured to said lens rings and extending through at least one loop of said lens rings;
   d. temple means secured to said temple hinge mounts, said temple hinge mounts and said temple means connected thereto forming a pivot point, said pivot point being supported, reinforced by and extending through said loops extending rearward from said lens rings.

2. The eyeglass frame of claim 1 wherein said temple hinge mounts have an L-shaped configuration.

3. The eyeglass frame of claim 1 or 2 wherein said lens rings have two loops extending rearward therefrom.

4. A frame for eyeglasses comprising:
   lens rings having at leas one loop extending rearward from the outer section of said lens rings and approximately perpendicular to said lens rings;
   a nose bridge connecting said lens rings;
   temple hinge mounts, said mounts being secured to said lens rings and extending rearward of said lens rings and passing contiguous with a rearward inside portion of said loop of said lens rings;
   temple means secured to said temple hinge mounts, said temple means and said temple hinge mounts connected thereto forming a pivot point, said pivot point being supported, reinforced by extending through said loop extending rearward from said lens rings.

* * * * *